United States Patent Office 3,236,882
Patented Feb. 22, 1966

3,236,882
PREPARATION OF CARBODIIMIDES
Burton D. Wilson, Rochester, N.Y., assignor to Eastman Kodak Company, Rochester, N.Y., a corporation of New Jersey
No Drawing. Filed Mar. 29, 1962, Ser. No. 183,416
6 Claims. (Cl. 260—501)

This invention relates to the preparation of carbodiimides involving the treatment of thioureas with silver oxide.

Various methods have been described in the art for preparing carbodiimides. For instance, described therein are procedures wherein thioureas are converted to carbodiimides by treatment with mercuric oxide or lead oxide. The products thus obtained are suitable for some uses, but the trace of heavy metal salt ordinarily remaining in the products renders them unacceptable for photographic purposes. In some cases other deleterious by-products are prone to form. Another procedure which has been described comprises the dehydration of ureas using pyridine and p-toluenesulfonyl chloride. The products thus obtained have good characteristics, but as a rule with this procedure the yields have been no higher than 20–40%.

One object of my invention is to provide a method for preparing carbodiimides which are useful for photographic purposes. Another object of my invention is to provide a method of preparing carbodiimides in which silver oxide is employed as a reagent therein. Further objects of my invention will appear herein.

In its broadest aspects my invention involves the treatment of a thiourea with silver oxide preferably at an elevated temperature whereby the thiourea is converted to a carbodiimide. The reaction is carried out by reacting a solution of the thiourea in an organic solvent with the silver oxide at a temperature of at least 25° C., preferably being carried out under reflux conditions. Any inert low boiling solvent for the thiourea may be used such as acetone, benzene, ether, carbon disulfide and the like. Refluxing acetone has been found to be useful as a general solvent even though the thiourea may not completely dissolve therein initially.

Some of the symmetrical aliphatic thioureas which may be employed as the starting material in the preparation of carbodiimides in accordance with my invention are the following: diallyl, dibenzyl, dibornyl, dibutyl, di-tert-butyl, dicyclohexyl, diethyl, diisobutyl, diisopropyl, di-l-menthyl, dimethyl, dioctyl, dipropyl, etc. Instead of using an aliphatic thiourea an aromatic thiourea may be desired as the starting material. Some symmetrical aromatic thioureas useful as starting material in processes in accordance with my invention are bis(p-bromophenyl), bis(o-bromophenyl), bis(p-carbethoxyphenyl), bis(2,4-dibromophenyl), bis(2,5-dibromophenyl), bis(p-diethylaminophenyl), bis(p-dimethylaminophenyl), bis[p-(p'-ethoxybenzeneazo)phenyl], bis(p-iodophenyl), bis(p-isobutylphenyl), di-alpha-naphthyl, di-beta-naphthyl, diphenyl, bis(p-propylphenyl), di-alpha-pyridyl, di-o-tolyl, di-m-tolyl, di-p-tolyl, etc. My invention also contemplates the use of unsymmetrical thioureas as starting material. If desired, some thioureas which are useful as starting material in preparing carbodiimides in accordance with my invention are the following: allylcyclohexyl, allyl-2-hydroxyethyl, allyl-2-hydroxypropyl, allylpropyl, allylphenyl, allyltrityl, benzyltrityl, bornyl(p-dimethylaminophenyl), cyclohexyl-tert-butyl, carboxyethylmethyl, cyclohexylphenyl, cyclohexylmethyl, cyclohexylisopropyl, etc. 1-ethyl-3-(3-dimethylaminopropyl) thiourea is illustrative of a thiourea having a tertiary amine function. This or a similar thiourea is preferably first converted to the metho-p-toluenesulfonate salt thereof by reacting with methyl p-toluenesulfonate and the resulting quarternized compound in solution is then refluxed with silver oxide.

The following examples illustrate my invention:

Example 1

A stirred slurry of 100 grams of silver oxide in 400 ml. of acetone containing 48.1 grams of dicyclohexylthiourea was heated for 18 hours under reflux. The mixture was filtered and the residue was washed well with hot acetone. The filtrate and washings were concentrated to about 200 ml. and cooled. Precipitated dicyclohexylurea (1.6 g.) was removed by filtration. The filtrate was further concentrated and the concentrate was distilled under vacuum (B.P. 141–144° C. at 6 mm.). There was thus obtained 36.1 grams (91% yield) of dicyclohexylcarbodiimide. The product partially crystallized upon standing. Instead of dicyclohexylthiourea, other thioureas as mentioned above may be employed in like manner.

Example 2

A stirred slurry of 18.8 grams of 1-ethyl-3-(3-dimethylaminopropyl)thiourea metho-p-toluenesulfonate and 35 grams of silver oxide in 500 ml. of acetone was refluxed for 22 hours, replacing the silver therein with 25 grams of fresh silver oxide at the midpoint. The resulting mixture was filtered and the residue was washed well with hot acetone. The filtrate and washings were concentrated to about 250 ml. and then diluted with 250 ml. of ether. The precipitated product obtained was allowed to stand overnight and then was collected and was dried in a vacuum desiccator. 15.1 grams (88% yield) of crude, hygroscopic 1-ethyl-3-(3-dimethylaminopropyl)carbodiimide metho-p-toluenesulfonate was obtained. Several recrystallizations were carried out from a 1:3 2-butanone-benzene mixture diluted to the cloud point with ether. There was thus obtained colorless crystals having a melting point of 130.5–132° C.

The intermediate used in Example 2 was prepared as follows:

A solution of 27.9 grams of ethyl isothiocyanate and 300 ml. of ether was stirred under anhydrous conditions adding 32.7 grams of N,N-dimethyltrimethylenediamine at a rate which maintained moderate refluxing. After 1 hour, 70 ml. of methyl p-toluene-sulfonate was added in portions over a five minute period to a clear solution of the thiourea which had formed. 5–10 minutes after this addition, the reaction became exothermic and a gummy solid separated, which soon became crystalline. The mixture was heated under reflux for 3 hours and was then filtered. The solid obtained was washed with ether and dried to give 127 grams of crude thiourea salt which was purified by several recrystallizations from acetone.

Instead of the particular thiourea used, some other thioureas having a tertiary amine function substituent therein would be gainfully employed in preparing a carbodiimide product in a similar manner to that described in Example 2.

The carbodiimides prepared in accordance with the invention described herein are of value for use as gelatin hardeners such as by incorporating .5–10% of the carbodiimide, based on the weight of the gelatin, in an aqueous gelatin composition as would be used for layers in photographic products. These hardeners are also useful for incorporating in gelatin silver halide photographic emulsions used in forming photographic products. Solutions of these carbodiimides are also useful for preparing prehardening baths used in the processing of photographic products, the use of prehardening baths for photographic processing being known in the art.

I claim:
1. A method of preparing a carbodiimide which comprises heating a solution of a thiourea in an inert low boiling solvent with silver oxide to a temperature of at least 25° C. whereby a substantial amount of carbodiimide is obtained.
2. A method of preparing a carbodiimide which comprises heating a solution of a symmetrical aliphatic thiourea in an inert low boiling solvent with silver oxide to a temperature of at least 25° C. whereby a substantial amount of carbodiimide is obtained.
3. A method of preparing a carbodiimide which comprises heating a solution of an aromatic thiourea in an inert low boiling solvent with silver oxide to a temperature of at least 25° C. whereby a substantial amount of carbodiimide is obtained.
4. A method of preparing carbodiimide which comprises heating a dispersion of a thiourea in acetone with silver oxide at refluxing temperature, whereby a substantial amount of carbodiimide is obtained.
5. A method of preparing dicyclohexylcarbodiimide which comprises heating a solution of dicyclohexylthiourea in acetone with silver oxide under refluxing conditions.
6. A method of preparing 1-ethyl-3-(3-dimethylaminopropyl)carbodiimide metho - p - toluenesulfonate which comprises refluxing a slurry of 1-ethyl-3-(3-dimethylaminopropyl)thiourea metho-p-toluenesulfonate and silver oxide in acetone until a substantial content of the carbodiimide is obtained.

References Cited by the Examiner

UNITED STATES PATENTS

| 2,263,730 | 11/1941 | Hentrich et al. | 260—551 |
| 2,372,873 | 4/1945 | Zappert | 96—111 |
| 2,938,892 | 5/1960 | Sheehan | 96—111 |
| 2,942,025 | 6/1960 | Coles et al. | 260—551 |
| 2,946,819 | 7/1960 | Coles | 260—551 |
| 2,950,197 | 8/1960 | Allen et al. | 96—111 |

FOREIGN PATENTS 924,751    3/1955    Germany.

OTHER REFERENCES

Chemical Abstracts, vol. 28, col. 3714 (1934) (abstract of Herbst et al., J. Biol. Chem., vol. 104, pages 769–88 (1934)).

Ephraim, "Inorganic Chemistry," 4th Ed., pages 160 to 465, Interscience Publishers, Inc. (New York) (1947).

Hornsby, Brit. J. Phot., vol. 103, page 100 (1956).

Khorana, "Chemical Reviews," vol. 53, pages 146–150 (1953).

Sheppard, "Gelatin in Photography," vol. 1, pages 83, 117, and 129, D. Van Nostrand and Co. (New York) (1923).

WALTER A. MODANCE, *Primary Examiner.*

PHILIP E. MANGAN, JOHN D. RANDOLPH, NICHOLAS S. RIZZO, *Examiners.*

B. E. EDELSTEIN, *Assistant Examiner.*